United States Patent [19]

Kulczyk et al.

[11] Patent Number: 4,911,034
[45] Date of Patent: Mar. 27, 1990

[54] EXTERNALLY SPRING-LOADED SLIP SHAFT

[75] Inventors: David Kulczyk, Torrington; John E. Dackow, Thomaston, both of Conn.

[73] Assignee: The Torrington Company, Torrington, Conn.

[21] Appl. No.: 189,008

[22] Filed: May 2, 1988

[51] Int. Cl.[4] ............................................. B62D 1/18
[52] U.S. Cl. ...................................... 74/492; 74/493; 403/377; 464/179
[58] Field of Search ................... 74/492, 493; 403/377, 403/383; 464/179, 180

[56] References Cited

U.S. PATENT DOCUMENTS

| 3,434,369 | 3/1969 | Runkle | 74/493 |
| 3,491,614 | 1/1970 | Saunders et al. | 74/493 |
| 4,106,311 | 8/1978 | Euler | 74/492 |
| 4,406,641 | 9/1983 | Mallet | 74/492 |
| 4,509,775 | 4/1985 | Arndt | 74/492 |
| 4,535,645 | 8/1985 | De Bisschop et al. | 74/492 |
| 4,572,022 | 2/1986 | Mettler | 74/492 |
| 4,833,936 | 5/1989 | Mariani et al. | 74/493 |

FOREIGN PATENT DOCUMENTS

| 98184 | 12/1983 | European Pat. Off. | 74/493 |
| 3339926 | 5/1985 | Fed. Rep. of Germany | 74/492 |
| 3400993 | 7/1985 | Fed. Rep. of Germany | 74/493 |
| 625888 | 7/1949 | United Kingdom | 403/383 |
| 1351780 | 5/1974 | United Kingdom | 74/492 |

Primary Examiner—Leslie A. Braun
Assistant Examiner—Scott Anchell
Attorney, Agent, or Firm—Frank S. Troidl

[57] ABSTRACT

A shaft slides within a tube. A relatively high-rate leaf spring is positioned to exert its force against the outer surface of the shaft. The leaf spring provides optimal sliding force between the shaft and the tube with minimum friction, while also functioning to minimize rotational lash. Indents located on the exterior surface of the tube are directed radially inward to further minimize rotational lash.

4 Claims, 2 Drawing Sheets

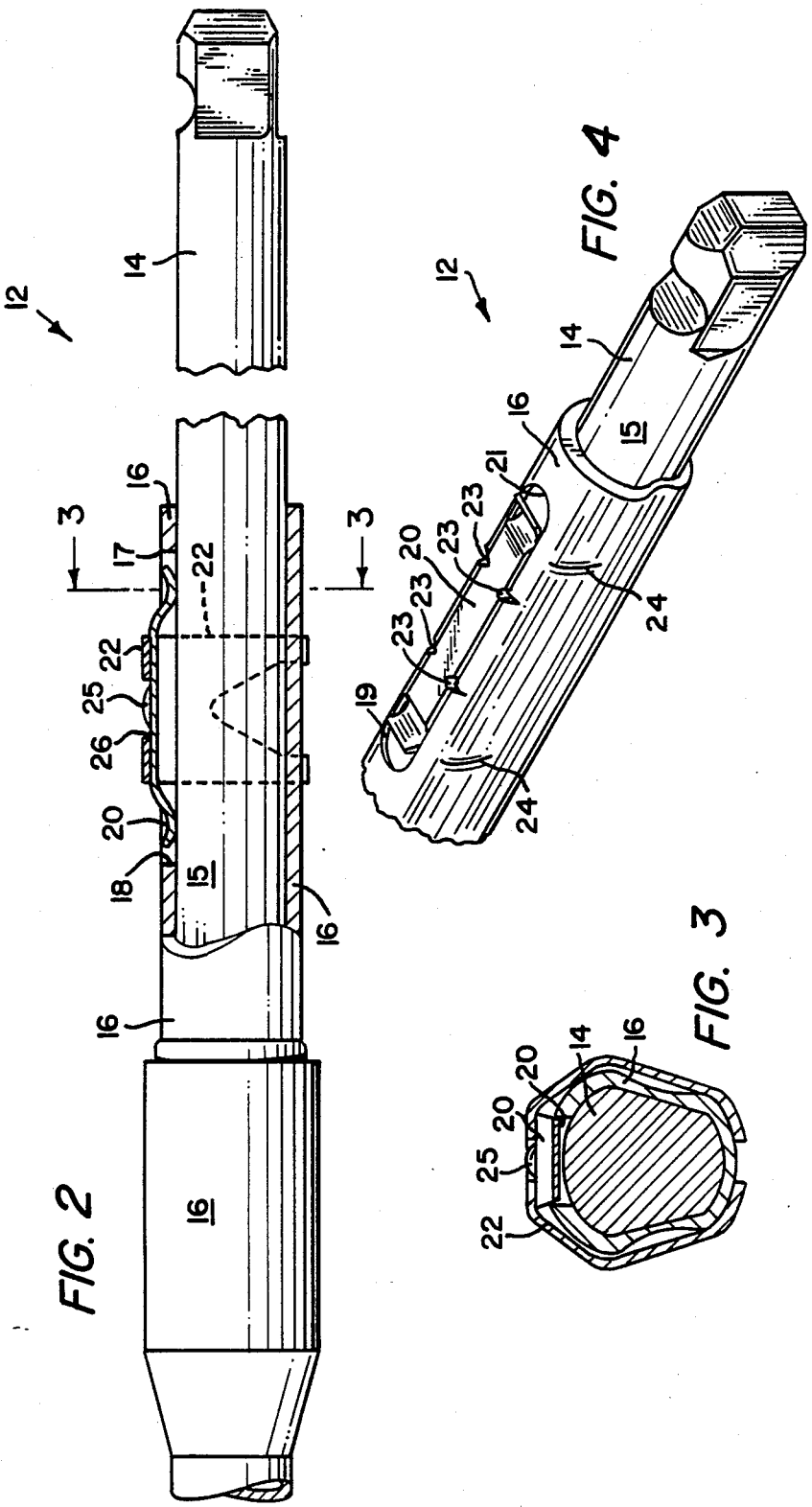

EXTERNALLY SPRING-LOADED SLIP SHAFT

This invention relates to a portion of a steering column assembly for use in automobiles; more particularly, it relates to the intermediate shaft which connects the lower portion of the steering column, attached to the steering wheel, to the steering gear.

Prior art patents disclose structures which combine a spring mechanism with mechanical parts designed to hold the steering column in a neutral position. An example of this type of prior art is included in U.S. Pat. No. 2,883,878 for a "Motion Transmitting Mechanism" issued in the name of Lowell V. Landgreen on Apr. 28, 1959. Other prior art patents disclose coil springs used to hold balls in positional notches on the outer surface of a sleeve in order to maintain a desired axial positioning of the steering wheel. An example of this type of prior art is disclosed in U.S. Pat. No. 3,773,137 for a "Safety Steering Gear For Automotive Vehicles" issued in the name of Angel Navarro Escudero on Nov. 20, 1973. Other examples of the prior art are disclosed in the following:

(1) U.S. Pat. No. 4,649,769 for a "Tilt-Telescope Steering Column" issued in the name of Frederick D. Venable on Mar. 17, 1987. Venable discloses two steering column members which may be telescoped relative to each other. One member is biased vertically relative to the other member by a spring acting against a snap ring (see FIG. 1).

(2) U.S. Pat. No. 4,563,912 for a "Telescoping Polygonal Steering Column" issued in the name of Kevin B. Parks on Jan. 14, 1986. Parks discloses a telescopic arrangement between two shafts in which a spring provides axial bias for a preload collar which provides engaging force between ramps 30 and wedges 22 and 23 (see FIG. 1).

(3) U.S. Pat. No. 3,318,170 for a "No-Lash Axially Movable Steering Column" issued in the name of Dean E. Runkle on May 9, 1967. Runkle discloses two telescoping shafts, with the inner hexagonal shaft sliding in a matching hexagonal bore through the outer shaft. A compression spring provides opposing axial bias for two ring-and-ball assemblies whereby the balls transmit a predetermined preload to the shafts to eliminate torsional lash between the shafts and obtain a nonvarying sliding friction between the shafts.

(4) U.S. Pat. No. 3,302,478 for an "Adjustable Steering Column" issued in the name of Edward M. Pauwels on Feb. 7, 1967. Pauwels discloses an axially movable shaft with an interior bore which slides over a fixed shaft sized to mate with the bore. A compression spring provides axial bias to a locking ring to urge the ring toward its locking position.

Even better prior art is disclosed in U.S. Pat. No. 4,535,645 for a "Vehicle Steering Sub-Assembly" issued in the names of James De Bisschop, Anthony A. Neri, and Thomas J. Williams on Aug. 20, 1985, and assigned to The Torrington Company. De Bisschop et al disclose a triangular shaft which makes a sliding fit with a tubular member having a matching configuration. A flat spring (see FIGS. 3–5) controls the tension between the shaft and the tubular member, and is positioned in a groove in the outer surface of the shaft so as to make sliding contact with the inner surface of the tubular member.

One of the main problems with the prior art is that the flat spring exerts its control force against the inner diameter surface of the outer tubular member. This surface is often uneven and irregular because of the way the tubular member is manufactured. This inner surface may contain seams from joint welds, for example. This relatively rough surface prevents the flat spring from controlling the slip force between the inner and outer members as well as it could otherwise. The slip shaft of the present invention overcomes these problems with a leaf spring which is oriented so as to exert its controlling force against the outer diameter surface of the inner shaft. This inner shaft is usually manufactured very differently from the outer tubular member discussed above. The inner shaft is typically formed by drawing it through a die. This type of process would result in a relatively smooth outer surface on the shaft. With the leaf spring pressing against this relatively smooth surface, the ability of the spring to control the slip force between the inner and outer members is greatly enhanced. This configuration allows the utilization of a spring having a relatively higher spring rate than in the prior art. As a result, the rotational lash is minimized while the slip force between the inner and outer members is kept as low as possible. The slip shaft of the present invention also reduces the problems of the prior art by the use of multiple indents in the outer surface of the outer tubular member. These indents are oriented radially inward so as to press against the outer surface of the inner shaft, thereby further minimizing rotational lash between the two members.

Briefly described, the externally spring-loaded slip shaft of this invention comprises an outer tubular member and an inner coaxial shaft member which makes a sliding fit inside the tubular member. A relatively high-rate leaf spring is positioned so as to exert its force against the outer surface of the inner shaft, and means are provided for reliably holding the leaf spring in this position. This leaf spring provides optimal sliding force between the two slip shaft members with minimal friction, while also functioning to minimize rotational lash. Indents located on the exterior surface of the outer tubular member are directed radially inward to further minimize rotational lash.

This invention may be better understood by reference to the following detailed description and drawings in which:

FIG. 2 is a side elevational view, partially in section, of the slip shaft shown in FIG. 1;

FIG. 3 is a cross-sectional view of the slip shaft in FIGS. 1 and 2, taken along line 3—3 in FIG. 2; and FIG. 4 an enlarged fragmentary view of an alternate embodiment of the slip shaft.

Figure 1:
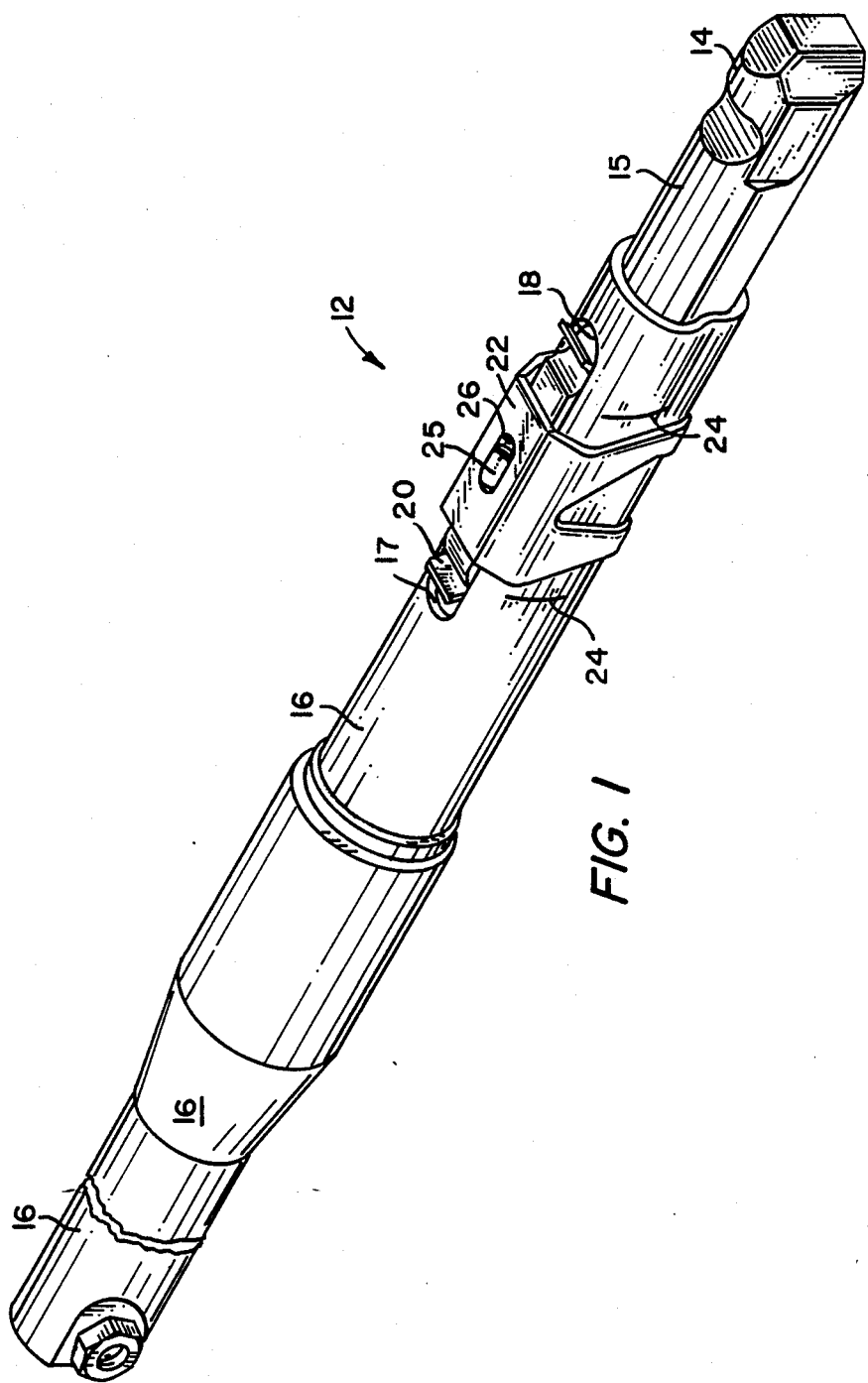
FIG. 1 is an isometric view of the preferred embodiment of the slip shaft of the present invention.

Referring to the drawings, and more particularly to FIG. 1, a slip shaft assembly 12 comprises a first member or an inner shaft 14, a second outer tubular member 16, a leaf spring 20, and a spring retainer 22. The first shaft member 14 is concentric and coaxial with second tubular member 16 so as to make a sliding fit with the inner surface of second member 16. Shaft 14 is typically manufactured by being drawn through a die. This results in a relatively smooth outer surface 15 having a minimal number of surface irregularities. Conversely, the second tubular member 16 is typically manufactured by methods which have much higher tolerances than the methods used for shaft 14. The inner surface of second member 16 is therefore typically very rough, with many more irregularities than the outer surface of shaft 14. Weld seams and mechanical forming perturbations are examples of the types of irregularities one could expect to find on the inner surface of second member 16.

Leaf spring 20 is positioned in an aperture 18 formed in the top surface (as depicted in FIGS. 1-3) of second member 16. Aperture 18 has peripheral edges 17 which encircle leaf spring 20. As best seen in FIGS. 2 and 3, leaf spring 20 makes contact with the outer surface of shaft 14 in two places. Spring 20 has a protuberance 25 projecting radially outwardly from its top surface. Protuberance 25 cooperates with an aperture 26 in spring retainer 22 to help keep spring 20 and retainer 22 in a fixed relative position. The tension between spring 20 and shaft 14 at the two contact points is controlled by the sizing of the spring retainer 22. As the circumference of retainer is made smaller, the tension increases; on the other hand, the tension decreases as the circumference increases. Spring retainer 22 is sized to provide a tension which ensures a smooth sliding fit between shaft 14 and tubular member 16 with minimal friction. At the same time, the tension also minimizes rotational lash between shaft 14 and member 16. Since the reduction of rotational lash requires increased spring tension, and a smooth sliding fit between shaft 14 and member 16 is enhanced by less spring tension, retainer 22 is sized to provide a tension which provides an optimal trade-off between these two factors. It is important to note that the reduced friction between leaf spring 20 and the outer surface of shaft 14 allows the use of a higher rate spring which is stiffer and provides less rotational lash than the prior art with about the same amount of sliding friction. Another feature which assists in minimizing rotational lash is the addition of multiple indents 24 in the outer surface of tubular member 16. Indents 24 are directed radially inward so that the inner surface of member 16 makes contact with the outer surface of shaft 14 at the location of each indent 24.

As illustrated best in FIG. 3, the cross-sectional configuration of shaft 14 is somewhat wedge-shaped in order to help minimize the rotational lash problem between shaft 14 and tubular member 16. This configuration is an improvement over cross-sections which have parallel opposing sides. In addition, this cross-sectional configuration is much easier to manufacture than the triangular cross-section disclosed in U.S. Pat. No. 4,535,645 to DeBisschop et al.

Turning now to FIG. 4, an alternate embodiment of the present invention is illustrated. The first shaft member 14 and leaf spring 20 are the same as those shown in FIGS. 1-3. The second tubular member 16 is almost the same, except for the peripheral edges 17 of aperture 18 shown in FIG. 1. There is no spring retainer, such as retainer 22 in FIG. 1; instead, peripheral edges 19 of aperture 21 in FIG. 4 are staked in four places, as shown at 23, in order to hold leaf spring 20 in position and provide the optimal tension between spring 20 and shaft 14.

We claim:

1. For use with a steering column intermediate shaft, a slip shaft assembly comprising:
    a first member having an elongate configuration and a relatively smooth outer surface;
    a second member having a generally tubular configuration with an inner surface and an outer surface, said second member being concentric and coaxial with said first member so that said inner surface makes a sliding fit with said outer surface of said first member;
    a leaf spring providing spring tension against said outer surface of said first member so as to minimize rotational lash between said first and second members while reducing sliding friction between said first and second members; and
    means for positioning said leaf spring against said outer surface of said first member comprising an aperture in said second member, said aperture having peripheral edges and being sized to accomodate said leaf spring, said aperture edges being formed to provide retention means for said leaf spring.

2. A slip shaft assembly according to claim 1 wherein said aperture edges are formed by staking.

3. A slip shaft assembly according to claim 1 wherein said outer surface of said second tubular member has one or more indents directed radially inward to further minimize rotational lash between said first and second members.

4. For use with a steering column intermediate shaft, a slip shaft assembly comprising:
    a first member having an elongate configuration and a relatively smooth outer surface;
    a second member having a generally tubular configuration with an inner surface and an outer surface, said second member being concentric and coaxial with said first member so that said inner surface makes a sliding fit with said outer surface of said first member;
    a leaf spring, said second member having an aperture sized to accomodate said leaf spring;
    a spring retainer surrounding said leaf spring and said second member and adapted to provide proper tension between said leaf spring and said first member outer surface, said spring retainer having an aperture, said leaf spring having a protuberance projecting radially outwardly into said spring retainer aperture.

* * * * *